US011959319B2

(12) United States Patent
Alan

(10) Patent No.: US 11,959,319 B2
(45) Date of Patent: Apr. 16, 2024

(54) FASTENING DEVICE

(71) Applicant: EMKA BESCHLAGTEILE GMBH & CO. KG, Velbert (DE)

(72) Inventor: Turgay Alan, Remscheid (DE)

(73) Assignee: EMKA BESCHLAGTEILE GMBH & CO. KG, Velbert (DE)

( * ) Notice: Subject to any disclaimer, the term of this patent is extended or adjusted under 35 U.S.C. 154(b) by 364 days.

(21) Appl. No.: 17/421,523

(22) PCT Filed: Jan. 9, 2020

(86) PCT No.: PCT/DE2020/100010
§ 371 (c)(1),
(2) Date: Jul. 8, 2021

(87) PCT Pub. No.: WO2020/143879
PCT Pub. Date: Jul. 16, 2020

(65) Prior Publication Data
US 2022/0120120 A1 Apr. 21, 2022

(30) Foreign Application Priority Data
Jan. 9, 2019 (DE) ..................... 10 2019 100 398.9

(51) Int. Cl.
*E05C 3/04* (2006.01)
*E05B 9/08* (2006.01)
*E05B 65/00* (2006.01)

(52) U.S. Cl.
CPC ................ *E05C 3/042* (2013.01); *E05B 9/08* (2013.01); *E05B 65/001* (2013.01)

(58) Field of Classification Search
CPC ..... E05C 3/00; E05C 3/02; E05C 3/04; E05C 3/041–046; E05B 9/00; E05B 9/08;
(Continued)

(56) References Cited

U.S. PATENT DOCUMENTS 328,244 A 10/1885 Morningstar
4,840,414 A 6/1989 Ford
(Continued)

FOREIGN PATENT DOCUMENTS

CN 206917460 U 1/2018
DE 1865319 1/1963
(Continued)

OTHER PUBLICATIONS

The International Bureau of WIPO, International Preliminary Report on Patentability and Written Opinion (with English translation), International Application No. PCT/DE2020/100010, 10 pages, Jul. 22, 2021.

(Continued)

*Primary Examiner* — Nathan Cumar
(74) *Attorney, Agent, or Firm* — Thompson Hine LLP

(57) ABSTRACT

A fastening device for axially fastening a rotatably mounted threaded pin to a closing element, in particular a door, having a fastening element, which can be screwed onto the threaded pin, and having a backward-rotation prevention means for securing the screwed-on fastening element, wherein the backward-rotation prevention means has a sealing region for sealing the threaded pin with respect to the closing element. The disclosure also describes a closure actuator and a closing element incorporating the fastening device.

16 Claims, 4 Drawing Sheets

(58) Field of Classification Search
CPC .......... E05B 9/082; E05B 9/084; E05B 9/086; E05B 9/088; E05B 65/00; E05B 65/001
USPC .......................................................... 292/356
See application file for complete search history.

(56) References Cited

U.S. PATENT DOCUMENTS

| | | | | |
|---|---|---|---|---|
| 8,092,129 | B2 * | 1/2012 | Wiley | F16B 43/00 411/160 |
| 2016/0131175 | A1 | 5/2016 | Hess | |
| 2018/0216365 | A1 | 8/2018 | Alan et al. | |

FOREIGN PATENT DOCUMENTS

| | | | | |
|---|---|---|---|---|
| DE | 2220609 | A1 * | 9/1972 | |
| DE | 2220609 | A1 | 11/1972 | |
| DE | 202017100455 | U1 | 3/2017 | |
| DE | 202017100455 | U1 * | 4/2017 | E05B 15/02 |
| GB | 1331916 | | 9/1973 | |
| JP | 2003307052 | A | 10/2003 | |
| WO | 2009/126181 | A1 | 10/2009 | |
| WO | WO-2009126181 | A1 * | 10/2009 | E05B 1/003 |
| WO | 2015/023815 | A1 | 2/2015 | |
| WO | WO-2015023815 | A1 * | 2/2015 | A61B 17/8665 |

OTHER PUBLICATIONS

European Patent Office, International Search Report (with English translation), International Application No. PCT/DE2020/100010, 6 pages, May 27, 2020.

* cited by examiner

FASTENING DEVICE

TECHNICAL FIELD

The invention relates to a fastening device for axially fastening a rotatably mounted threaded pin to a closing element, in particular a door. Furthermore, the invention relates to a closure actuator for actuating a closure element and also to a closing element, in particular a door, having an actuating element, a closure element, in particular a cam latch, and a closure actuator.

BACKGROUND

Corresponding fastening devices are used in many fields of technology in order to fasten threaded pins to closing elements, such as, for example, doors, flaps, windows or hatches and to prevent an axial movement of the threaded pins.

Locking corresponding closing elements as a rule require an actuating element, for example in the form of a door handle, being situated on the outer side of said closing elements, and a closure element, such as, for example, a cam latch, being situated on the inner side of said closing elements. It is possible by way of a movement of the actuating element for the closure element then to be moved back and forth between a locking position, in which the closing element is locked, and an unlocking position, in which the closing element can be opened. In order to transmit the movement of the actuating element to the closure element, use can be made of threaded pins via which the actuating element and the closure element are rotatably coupled to one another. In order to lead the threaded pin through the closing element, the latter generally has a bore. On the outer side of the closing element, the threaded pin is then connected to the actuating element, and, on the opposite door inner side, correspondingly to the closure element.

In order to fix the threaded pins in the axial direction, use is made as a rule of fastening elements which, for example, can be screwed onto the threaded pins in the manner of a nut. In the mounted state, these fastening elements lie against the inner side of the closing element and thus prevent an axial movement of the threaded pin in relation to the closing element. Since the fastening elements move together with the threaded pin relatively with respect to the closing element during an actuation of the closure element, what can occur, however, is that the fastening element is released from the threaded pin and moves in the axial direction so as then to no longer be able to ensure reliable securing of the threaded pin. In order for such unintended movements of the fastening element on the threaded pin to be prevented, use is mostly made of back-rotation prevention means for securing the screwed-on fastening elements. Such a back-rotation prevention means can, for example, be a locknut which can be screwed onto the fastening elements screwed onto the threaded pin and thus prevent a situation in which the fastening elements can be unintentionally released.

Furthermore, it is often required in practice that the inner spaces to be closed by the closing element have to be sealed in relation to the surroundings or in relation to the outer space, with the result that, for example, if on the outer side of the closing element there prevails a higher or a lower pressure than on the inner side of the closing element, a minimum gas exchange, if any, can take place.

For sealing purposes, recourse can be had, for example, to O-rings which can be arranged in the bore of the closing element through which the threaded pin extends. Although such a seal can indeed be used to prevent a gas exchange as far as possible, even with a rotation of the threaded pin, what is disadvantageous is that the threaded pin first of all has to be provided with a groove for the O-ring, this making such a construction comparatively complicated.

SUMMARY

Proceeding therefrom, the invention sets itself the object of specifying a fastening device for axially fastening a rotatably mounted threaded pin that allows reliable sealing by means of constructionally simple means.

This object is achieved with a fastening device of the type stated at the outset in that the back-rotation prevention means has a sealing region for sealing the threaded pin in relation to the closing element. It is thus possible, via the back-rotation prevention means, for the threaded pin to be reliably sealed in relation to the closing element. It is not possible for a gas exchange between the inner space and the outer space to occur through the bore in the closing element through which the threaded pin extends. It is no longer required to provide the threaded pin with a groove or the like in order for a sealing element to be arranged thereon. Nevertheless, the threaded pin is also axially secured by the fastening device.

It has furthermore been found to be advantageous if the back-rotation prevention means is arranged between the closing element and the fastening device. This arrangement allows the back-rotation prevention means to interact both with the threaded pin and with the closing element and thus to bring about reliable sealing of the threaded pin in relation to the closing element.

In order to seal the back-rotation prevention means in relation to the threaded pin, it has been found to be advantageous if the sealing region of the back-rotation prevention means has a radial sealing portion. The radial sealing portion can serve for reliable sealing of the back-rotation prevention means in relation to the threaded pin. The radial sealing portion can, for that purpose, be pressed, radially with respect to the longitudinal axis of the threaded pin, into the thread turns of the threaded pin.

Furthermore, it has been found to be advantageous if the fastening element has a first pressing region which is configured in such a way that, upon screwing the fastening element onto the threaded pin, it presses the radial sealing portion radially onto the threaded pin. When the fastening element is being screwed on, the first pressing region interacts with the back-rotation prevention means, with the result that the first sealing portion configured as a radial sealing portion is pressed onto the threaded pin. The contact pressure force can be set via the fastening element. The stronger the fastening element is tightened, the stronger is the pressing of the first sealing portion onto the threaded pin.

With regard to the configuration of the pressing region, it has been found to be advantageous if the latter is configured in such a way that, upon screwing the fastening element onto the threaded pin, it presses the radial sealing portion of the back-rotation prevention means circumferentially uniformly onto the threaded pin. The fact that this first sealing portion is pressed circumferentially uniformly onto the threaded pin results in a reliable sealing of the back-rotation prevention means in relation to the threaded pin. The sealing portion can be pressed uniformly onto the sealing portion in the radial direction, with the result that the sealing portion is uniformly deformed when pressing on. The radial sealing portion can, upon screwing on the fastening element, be elastically deformed by the first pressing region, with the result that the pressing region presses the sealing region into the thread turns of the threaded pin. The first pressing region can be configured conically in the manner of a funnel or of a truncated hollow cone. The larger opening can be made to face the back-rotation prevention means. The smaller opening can open into the threaded bore of the fastening element. The first pressing region can have a press-on oblique surface. The first pressing region can project in the axial direction.

With regard to the configuration of the radial sealing portion, it has proved to be advantageous if the latter is curved forward in the axial direction. By virtue of a corresponding configuration, the sealing region can be pressed onto the threaded pin in the radial direction by a pressing force of the first pressing region that acts in the axial direction. The radial sealing portion can be curved forward in the direction of the fastening element. The pressing force acting on the sealing portion from the pressing region can be oriented perpendicular to the sealing force acting in the radial direction. The first sealing portion can be configured to be conical at least in certain portions. By virtue of an axial pressing force acting on the conical surface, the sealing portion can be pressed radially onto the threaded pin given the flank angle of the conical surface. Furthermore, it is also possible for the first sealing portion to have a rounding that allows an axial pressing force to lead to the sealing portion being pressed on radially. The shape of the first pressing region and of the first sealing portion can be tailored to one another.

Furthermore, it has been found to be advantageous if the sealing region has an axial sealing portion for sealing the back-rotation prevention means in relation to the closing element. The axial sealing portion can be configured as a second sealing portion of the sealing region. The axial sealing portion can be able to be pressed onto the inner side of the closing element and thus lead to reliable sealing of the back-rotation prevention means in relation to the closing element. Since the back-rotation prevention means moves relatively with respect to the closing element during a rotation of the threaded pin, it is advantageous if the axial sealing force, which acts in the axial direction, of the second sealing portion on the closing element is less than the radial sealing force, which acts in the radial direction, of the first sealing portion on the threaded pin. The axial direction can extend parallel to the longitudinal axis of the threaded pin.

From a construction point of view, it has proved to be advantageous if the axial sealing portion is arranged on a front side of the back-rotation prevention means. This arrangement allows the axial sealing portion to bring about reliable sealing of the back-rotation prevention means in relation to the closing element.

Furthermore, it has been found to be advantageous from a construction point of view with respect to the fastening element if the axial sealing portion has a sealing lip for interacting with a groove arranged in the closing element. The interaction between the sealing lip and the groove allows the required axial sealing force to be reduced. The sealing lip can be configured in the manner of an O-ring and be arranged concentrically to the threaded pin. This configuration allows reliable sealing to be maintained during a rotation of the threaded pin and of the back-rotation prevention means. Furthermore, the sealing lip and the groove can also interact in the manner of a labyrinth seal. This allows a smoother-running actuation of the threaded pin, since the axial sealing force can be lower still in this case. That side of the axial sealing portion that faces the closing element can be configured as a sliding surface. This also allows a smoother-running movement of the threaded pin to be achieved.

Furthermore, it has proved to be advantageous if the fastening element has a second pressing region which is configured in such a way that, upon screwing the fastening element onto the threaded pin, it presses the axial sealing portion axially onto the closing element. The second pressing region can act on the axial sealing portion in the axial direction. Firmly tightening the fastening element allows both the radial and the axial sealing force to be set.

With regard to the connection of the back-rotation prevention means to the threaded pin, it has proved to be advantageous if the back-rotation prevention means can be plugged nonrotatably onto the threaded pin. The back-rotation prevention means can be plugged onto the threaded pin in the axial direction; however, it cannot be rotated with respect to the threaded pin. The back-rotation prevention means and the threaded pin can be rotatably coupled. The back-rotation prevention means and the threaded pin can be positively connected to one another at least in the direction of rotation.

With regard to the connection of the back-rotation prevention means to the threaded pin, it has furthermore been found to be advantageous if the back-rotation prevention means has a polygonal cutout for receiving the threaded pin. The cutout can be tailored to the cross section of the threaded pin. Preferably, the threaded pin also has a polygonal cross section. This allows a reliable positive connection, with the result that a rotational movement of the threaded pin also leads to a corresponding rotational movement of the back-rotation prevention means. What is to be understood by polygonal is not merely cross sections formed via straight lines but all cross sections which deviate from a pure circular cross section and thus allow a positive connection. Oval or circular cross sections having a notch are also to be understood as falling under polygonal.

It has been found to be particularly advantageous if the threaded pin has a square cross section, optionally with rounded-off corners. The threaded pin can thus be configured as a square threaded pin. Such a threaded pin is able to be produced simply and allows a reliable positive connection with the back-rotation prevention means. The cutout of the back-rotation prevention means can thus also preferably be a square cutout, optionally with rounded-off corners.

Furthermore, it has proved to be advantageous if the radial sealing portion is arranged around the cutout. It is particularly advantageous if the cutout extends through the radial sealing portion. This allows reliable sealing if the radial sealing portion is pressed onto the threaded pin in the radial direction.

Furthermore, it has been found to be advantageous if the back-rotation prevention means can be connected to the fastening element. Since the back-rotation prevention means is only able to move in the axial direction in relation to the threaded pin, and the fastening element can be screwed onto the threaded pin, but cannot be plugged on axially like the back-rotation prevention means, the two fastening elements are mutually secured if they are connected to one another. With the fastening element screwed on, the back-rotation prevention means can no longer be moved in the axial direction, and the fastening element can no longer be rotated, since the back-rotation prevention means prevents such a rotational movement. The back-rotation prevention means and the fastening element can be releasably connected to one another. This allows simple demounting of the fastening device.

With regard to the connection of the back-rotation prevention means to the fastening element, it is furthermore advantageous if the back-rotation prevention means can be latched with the fastening element. A latching connection allows a simple and self-locking connection. If the fastening element is screwed onto the threaded pin, it can automatically latch with the back-rotation prevention means. The fastening element is then only able to be screwed further onto the threaded pin, but is no longer able to be unscrewed, since a corresponding movement is prevented by the back-rotation prevention means. At least in the unscrewing direction, the back-rotation prevention means is then positively connected to the fastening element. If the fastening element is screwed onto the threaded pin to such an extent that the back-rotation prevention means also prevents a movement of the fastening element in the screwing-on direction, no movement at all is still possible. The back-rotation prevention means can act like a ratchet for the fastening element, allowing only a movement in a direction of rotation.

With regard to the latching connection, it has been found to be advantageous if the back-rotation prevention means has a latching toothing with a plurality of latching steps. The latching toothing can be designed in the manner of a latching rim projecting in the axial direction. The latching rim can be arranged concentrically around the cutout of the back-rotation prevention means, and hence also be arranged concentrically with respect to the longitudinal axis of the threaded pin. The latching toothing, or the individual teeth of the latching toothing, can extend in the radial direction, in particular outwardly, away from the threaded pin. The individual teeth of the latching toothing can be configured as saw teeth. This makes possible in a simple manner a situation in which only a rotation in one direction of the fastening element is prevented.

The fastening element can have a locking toothing for engaging in the latching toothing of the back-rotation prevention means. The locking toothing can have a plurality of locking teeth which can be configured in the manner of saw teeth. This configuration makes it possible for the latching toothing and the locking toothing to be able to interact in such a way that the fastening element is rotatable only in one direction. If the locking teeth engage in the latching toothing, the fastening element can only be screwed further onto the threaded pin, but can no longer be unscrewed therefrom, at least as long as the teeth of the locking toothing and of the latching toothing are in engagement.

Also by virtue of the sawtooth shape of the teeth, the locking toothing latches into the various latching teeth in a gradual automatic manner during a rotation of the fastening element, since the locking toothing is pretensioned in the direction of the latching toothing. The pressing force, and hence the radial sealing force and optionally also the axial sealing force, increase successively if the locking toothing engages into the various latching steps of the latching toothing during a rotation of the fastening element.

In order to release the back-rotation prevention means from the fastening element, with the result that the fastening element can be unscrewed again from the threaded pin, the latching connection between the locking toothing and the latching toothing can be released. The locking toothing can be pretensioned by way of a tensioning device. The tensioning device can be pretensioned on account of the intrinsic tension of its material and can be configured as a spring catch. There is then no need for an additional spring element. The tensioning device can have a handle in the form of an unlocking pin via which the locking toothing can be moved counter to its pretensioned position. The locking toothing and the latching toothing can be disengaged thus. The connection between the back-rotation prevention means and the fastening element can be released manually. The handle, or the unlocking pin, can project in a radial direction such that it is simple to reach.

Furthermore, it has been found to be advantageous if the two pressing regions of the fastening element are arranged so as to be spaced apart from one another in such a way that they form an, in particular ring-shaped, receiving space. For this purpose, the two pressing regions can be arranged concentrically to one another. The receiving space can serve to receive the latching toothing. If the two fastening elements are connected to one another, the latching toothing can lie in the receiving space. The locking toothing can protrude laterally into the receiving space.

With regard to the back-rotation prevention means, it has been found to be advantageous if the latter has a bearing bush for mounting the threaded pin. The bearing bush can be configured in a manner of a hollow cylinder. The bearing bush can be able to be plugged into a bore of the closing element and serve to guide the threaded pin, with the result that the latter does not jam in the bore of the closing element during a rotation. The bearing bush can have an, in particular peripheral, insertion slope which facilitates mounting or insertion of the bearing bush into the bore of the closing element. It is advantageous if the outside dimensions of the bearing bush correspond to the diameter of the bore. The cutout can extend by virtue of the bearing bush, with the result that the bearing bush lies against the threaded pin, in particular with full-surface contact.

With regard to the production of the back-rotation prevention means, it has been found to be advantageous if the latter is configured as a multicomponent plastics part, in particular as a two-component plastics part, wherein a first plastics component forms the sealing region, and a harder, second plastics component forms the remaining regions of the back-rotation prevention means. Corresponding plastics parts are able to be produced cost-effectively in mass production. The softer sealing component is able to deform in a comparatively easy manner when subjected to the action of force, resulting in reliable sealing. The harder plastics component can impart the required stability to the back-rotation prevention means. The latching toothing, the bearing bush and a ring region circumferentially enclosing the sealing region can be produced from the harder plastics component.

With regard to the production of the fastening element, it has been found to be advantageous if the latter is produced by a multicomponent injection-molding method, in particular by a two-component injection-molding method. This method allows the production of the back-rotation prevention means in a single method step, although the back-rotation prevention means consists of two different materials. Thus, a cost-effective and quick manufacture of the back-rotation prevention means is achieved.

With regard to the fastening element, it has been found to be advantageous if the latter has, for the purpose of screwing onto the threaded pin, a threaded bore. The threaded bore can be configured to be round and extend centrally through the fastening element. The diameter of the threaded bore can correspond to the maximum diameter of the threaded pin, with the result that the fastening element is able to be screwed onto the threaded pin. The internal thread of the threaded bore can correspond to the external thread of the threaded pin.

It has furthermore been found to be advantageous if the fastening element has a circumferentially arranged handling region by way of which the fastening element is manually moved and is able to be screwed onto the threaded pin. It is possible, by way of the handling region, for the fastening element to be tightened by hand. The handling region can be provided circumferentially with fluting, thereby making manual rotation easier. The handling region can be connected to the second pressing region.

Furthermore, it is advantageous if the handling region, in the connected state, covers the latching toothing or the latching rim of the back-rotation prevention means in the manner of a cap. In the connected state, the latching toothing thus is not visible from the outside and is protected from external influences and dirt.

With regard to the object stated at the outset, there is also proposed a closure actuator for actuating a closure element, in particular a cam latch, with a threaded pin and a fastening device for fastening the threaded pin to a closing element, wherein the fastening device is configured in the above-described manner.

There result the advantages that have already been described with regard to the fastening device. The advantageous developments of the threaded pin that have been described with regard to the fastening device are, moreover, also correspondingly useable in the closure actuator.

In order to move the closure element, and hence to lock or unlock the closing element, the closure element can be moved by way of the closure actuator. The closure actuator can thus serve as a drive for the closure element. The closure element can be able to be plugged onto the threaded pin and rotatably coupled thereto. It is advantageous if the closure element has a cutout which is adapted to the geometry of the threaded pin, with the result that a positive rotary coupling between the threaded pin and the closure element is made possible. The cutout of the closure element can correspond to the cutout of the back-rotation prevention means.

It has been found to be advantageous if the fastening device is independent of the actuating element. In particular, it is advantageous if the fastening device is not connected to the actuating device. This allows fastening of the threaded pin independently of the thickness of the closing element or of the door.

Furthermore, with regard to the object stated at the outset, there is proposed a closing element, in particular a door, having an actuating element, a closure element, in particular a cam latch, and a closure actuator, wherein the closure actuator is configured in the above-described manner and comprises a threaded pin and a fastening device. There result the advantages that are described in particular with regard to the fastening device.

BRIEF DESCRIPTION OF THE DRAWINGS

Further details and advantages of the fastening device, of the closure actuator and of the closing element will be explained in more detail below on the basis of the illustrations of an exemplary embodiment, in which.

DETAILED DESCRIPTION

Figure 1:
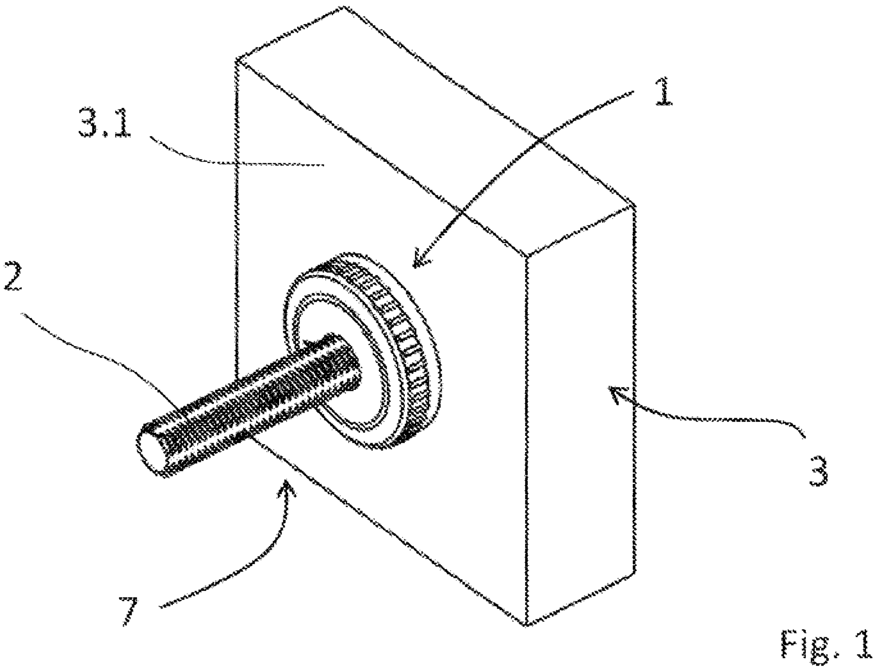
FIG. 1 shows a closing element having a fastening device for axially fastening a threaded pin to the closing element.

FIG. 1 is a perspective view showing a detail of a closing element 3 configured as a door. The door 3 has a bore 3.6 through which there extends a threaded pin 2 in the form of a square threaded pin from the outer side of the door 3.2 up and into the inner space adjoining the inner side of the door 3.1.

On the outer side of the door 3.2 there is arranged an actuating element 3.4 which, however, on account of the direction of view in FIG. 1, cannot be seen. It is possible, via the actuating element 3.4, for the square threaded pin 2 to be rotated about its longitudinal axis. At the end of the square threaded pin 2 that protrudes into the inner space, there is arranged a closure element 3.5, which is configured as a cam latch and via which the door 3 can be locked or unlocked. In the locking position, the cam latch 3.5 engages, for example, behind an undercut (not shown) and thus ensures that the door 3 can no longer be opened. In order to open the door 3 again, the cam latch 3.5 must first of all be moved out of the undercut again, for which purpose the square threaded pin 2 is rotated by way of the actuating element 3.4.

By virtue of the nonround configuration of the threaded pin 2, it is possible for the cam latch 3.5 to be mounted on the threaded pin 2 in a very simple manner. This is because the cam latch 3.5 need, in principle, only be secured against an axial movement, since it is positively rotatably coupled to the square threaded pin 2 by virtue of the cross-sectional shape of the latter. Accordingly, the cam latch 3.5 is able to be plugged onto the square threaded pin 2 in the axial direction, but is not rotatable relative to the square threaded pin 2.

In the illustration of FIG. 3, there can be seen both the actuating element 3.4 (not shown in FIG. 1) and the cam latch 3.5. The square threaded pin 2 and the fastening device 1 together form a closure actuator 7 for the cam latch 3.5.

On the outer side of the door 3.2, the square threaded pin 2 is fixed by way of the actuating element 3.4 in such a way that the square threaded pin 2 cannot be pulled into the inner space. However, the actuating element 3.4 does not secure the square threaded pin 2 against an axial movement in the direction of the outer side of the door 3.2, or in the direction of the outer space. For this reason, it is required for the square threaded pin 2 also to be secured on the inner side of the door 3.1 in the axial direction. In the illustration of FIG. 1, the square threaded pin 2 is secured by the fastening device 1 in such a way that it can no longer be moved in the axial direction.

Figure 2:
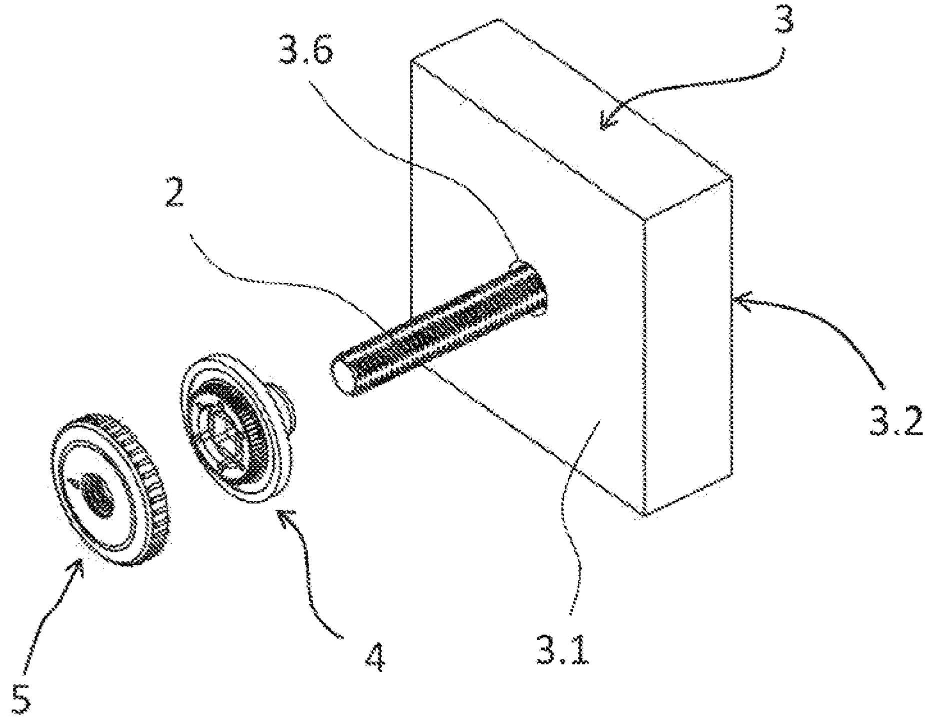
FIG. 2 shows an exploded view according to FIG. 1.

As can be seen in the exploded representation according to FIG. 2, the fastening device 1 consists substantially of two individual elements, namely a back-rotation prevention means 4 and a fastening element 5. During the mounting operation, the back-rotation prevention means 4 is first of all pushed over the square threaded pin 2 in the axial direction until it lies against the inner side of the door 3.1. In a second step, the fastening element 5 is then screwed onto the square threaded pin 2. Since the back-rotation prevention means 4 and the fastening element 5 are independent of the actuating element 3.4 arranged on the opposite side of the door 3, it is possible, with the fastening device 1, for threaded pins 2, independently of the thickness of the door 3, to be fastened to the latter or to be axially secured on the latter.

The back-rotation prevention means 4 has a square-shaped cutout 4.2 which is adapted to the size of the square threaded pin 2. Therefore, although the back-rotation prevention means 4 is able to be pushed onto the square threaded pin 2, it is not able to be rotated with respect thereto, but is rotatably coupled thereto. During a movement of the square pin 2, the back-rotation prevention means 4 therefore rotates together with the square threaded pin 2 as a result of the positive connection in the direction of rotation.

The fastening element 5 has a threaded bore 5.6, via which it can be screwed onto the square threaded pin 2. The fastening element 5 is thus not able to be pushed axially onto the square threaded pin 2, but rather can only be screwed onto the latter in the manner of a nut. If the back-rotation prevention means 4 is plugged onto the square threaded pin 2, and the fastening element 5 has been screwed far enough onto the square threaded pin 2, the back-rotation prevention means 4 latches with the fastening element 5, which will be explained in more detail below on the basis of the further figures. If the two elements 4, 5 are latched with one another, they are no longer movable relative to one another. This is because, since the back-rotation prevention means 4 is not rotatable on the square threaded pin 2, the latter prevents the fastening element 5 from being able to be rotated. Furthermore, the fastening element 5 prevents the back-rotation prevention means 4 from being able to be moved axially, since said fastening element is only rotatable, but not purely axially movable. In this connected position illustrated in FIG. 1 and also in FIG. 6, the square threaded pin 2 can continue, by way of the actuating element 3.4, to be rotated about its longitudinal axis, but can no longer be moved in the axial direction. In this connected position, the back-rotation prevention means 4 is arranged between the closing element 3 and the fastening element 5.

Before any more detailed discussion is given below of the latching engagement between the back-rotation prevention means 4 and the fastening element 5, it will first of all be described by way of FIGS. 3*a* and 3*b* how the fastening device 1 not only axially secures the square threaded pin 2, but also seals the inner space in relation to the outer space or seals the threaded pin 2 in relation to the door 3.

The back-rotation prevention means 4 has a sealing region 4.3 with a radial sealing region 4.31 and an axial sealing region 4.32. The radial sealing region 4.31 serves for sealing the back-rotation prevention means 4 in relation to the square threaded pin 2, and the radial sealing region 4.32 serves for sealing the back-rotation prevention means 4 in relation to the door 3. In the text that follows, the axial sealing region 4.32 is also referred to as the second sealing region, and the radial sealing region 3.31 is referred to as the first sealing region.

It is thus possible, by way of the sealing portion 4.3, for the inner space to be reliably sealed in relation to the outer space, with the result that only a very small gas exchange, if any, is possible. It is therefore not absolutely necessary for the actuating element 3.4 arranged on the outer side of the door 3.2 also to have additional sealing.

Figure 3A:
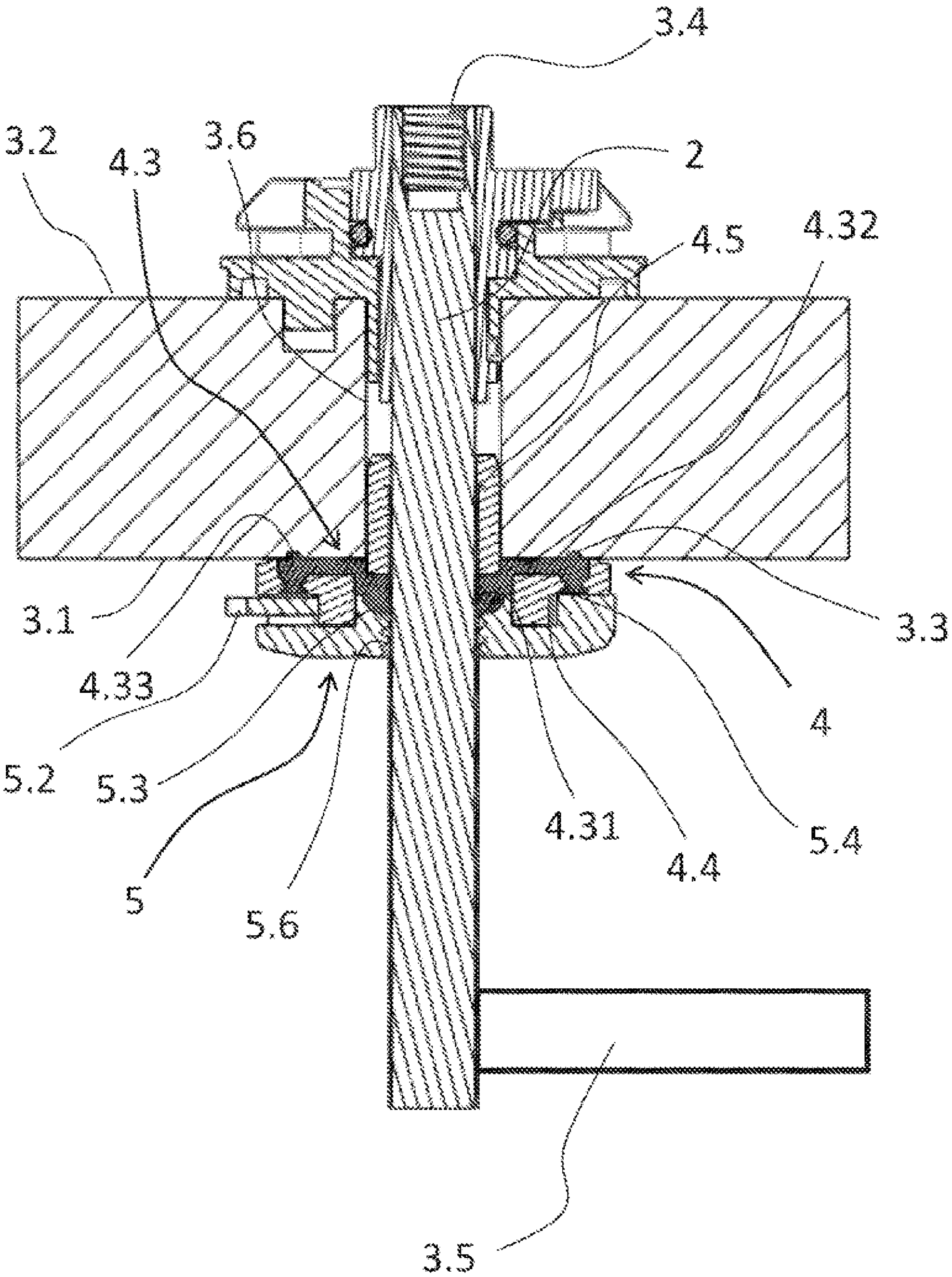
FIG. 3*a* shows a sectional view of the fastening device according to FIG. 1.

If the back-rotation prevention means 4 is situated in the position shown in FIG. 3*a* and the second sealing portion 4.32 lies against the door 3, the fastening element 5 is screwed onto the square threaded pin 2. It is then possible, via the fastening element 5, for the first sealing portion 4.31 to be pressed against the square threaded pin 2 and for the second sealing portion 4.32 to be pressed against the inner side of the door 3.1 in order to correspondingly seal the inner space. The fastening element 5 has for that purpose a first and a second pressing region 5.3, 5.4 which can best be seen in the enlarged illustration of FIG. 3*b*.

The first pressing region 5.3 has a funnel-shaped contour which widens in the direction of the back-rotation prevention means 4. The flank angle of the funnel is approximately 45 degrees. The first sealing portion 4.31 has, by contrast, a contour that narrows in the direction of the fastening element 5. This contour can either, analogously to the funnel shape of the first pressing region 5.3, be funnel-shaped or cone-shaped. However, it is also possible for it to be rounded off, as is the case in the exemplary embodiment according to FIG. 3*b*. If the fastening element 5 is screwed onto the square threaded pin 2, the first pressing region 5.3 comes into contact with the first sealing portion 4.31. By virtue of the contours of the two regions 4.31, 5.3, the pressing force Fp acting in the axial direction results in the first sealing portion 4.31 being pressed uniformly onto the square threaded pin 2 in the radial direction from all sides. In FIG. 3*b*, this is illustrated by the radial sealing force Fdr acting in the radial direction. The stronger the fastening element 5 is tightened, the greater the pressing by the first pressing region 5.3 of the first sealing portion 4.31 onto the square threaded pin 2.

Figure 3B:
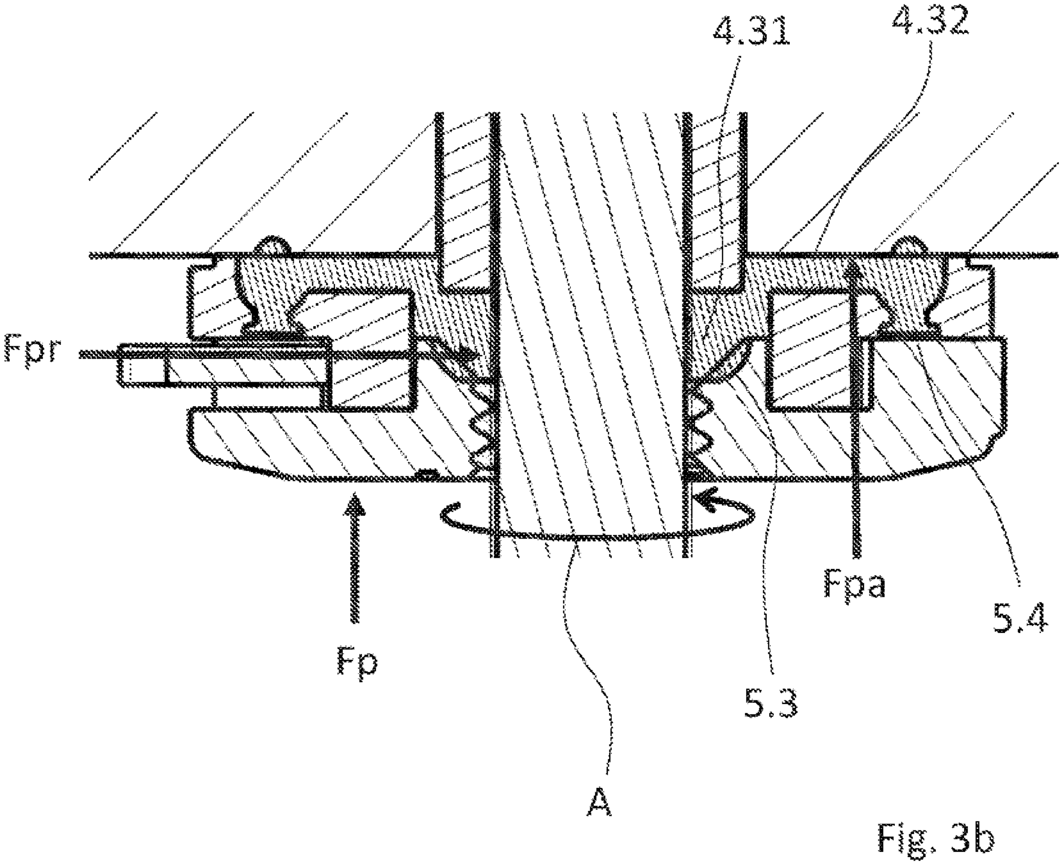
FIG. 3*b* shows a detail view of the sectional view according to FIG. 3*a;*

Although FIGS. 3*a* and 3*b* illustrate a situation in which the first sealing portion 4.31 and the first pressing region 5.3 overlap, what happens in reality, however, is that the first pressing region 5.3 displaces or deforms the softer first sealing portion 4.31, with the result that the latter adopts the contour of the first pressing region 5.3 and is correspondingly pressed onto the square threaded pin 2.

The fastening element 5 has, furthermore, a second pressing region 5.4 which interacts with the second sealing portion 4.32. The second pressing region 5.4 presses the second sealing portion 4.32 against the door 3 and thus seals the back-rotation prevention means 4 in relation to the door inner side 3.1. Here, the radial sealing force Fdr acts on the second sealing portion 4.32 or on the door 3. However, this force is smaller than the axial sealing force Fda, since considerably more sealing area is available for sealing between the back-rotation prevention means 4 and the door 3, and it is therefore not necessary for the back-rotation prevention means 4 to be pressed firmly onto the door 3.

In order to increase the sealing action between the second sealing portion 4.32 or that of the back-rotation prevention means 4 and the door 3, the second sealing portion 4.32 is additionally equipped with a sealing lip 4.33, which can engage into a groove 3.3, which is arranged on the door 3 and which is configured in the manner of an annular groove. This sealing lip 4.33 serves to improve the sealing and reduces the required axial sealing force Fda.

As is evident from the different hatchings in FIGS. 3*a* and 3*b*, the back-rotation prevention means 4 consists of two different components: a softer sealing component, of which the sealing region 4.3 consists, and a harder component, of which the remaining regions of the back-rotation prevention means 4 consist. The two components are each plastics, with the result that the back-rotation prevention means 4 can in principle be produced in one step by means of a two-component injection-molding method.

Figure 4A:
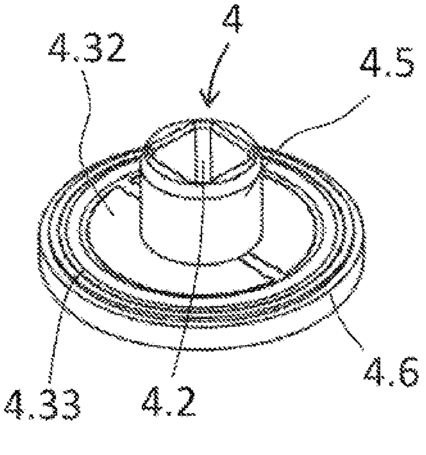
FIGS. 4*a, b* show perspective views of the back-rotation prevention means.
Figure 4B:
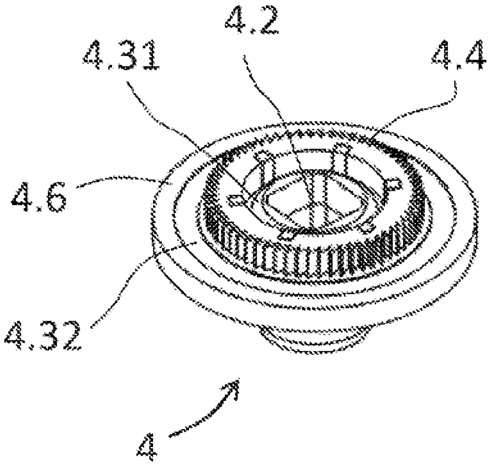

FIGS. 4*a* and 4*b* each illustrate the back-rotation prevention means 4 in a different perspective view. The back-rotation prevention means 4 is configured to be rotationally symmetrical and has a mushroom-shaped configuration. Projecting in the axial direction, the back-rotation prevention means 4 has a bearing bush 4.5, as can be seen in FIG. 3*a*, which can be plugged into the bore 3.6 of the door 3. This bearing bush 4.5 forms a bearing arrangement for the square threaded pin 2 and ensures that the latter can only rotate in the bore 3.6, but cannot move radially and thus possibly wedge.

Extending through the back-rotation prevention means 4 is a cutout 4.2 which is adapted to the contour of the square threaded pin 2 and, in the exemplary embodiment, is configured as a square cutout 4.2. The cross section of this cutout 4.2 ensures that the back-rotation prevention means 4 is rotatably coupled to the square threaded pin 2.

On the side of the back-rotation prevention means 4 that is opposite to the bearing bush 4.5, there is situated a latching toothing 4.4 which extends all the way round the cutout 4.2 in the manner of a latching rim. The latching toothing 4.4 has a plurality of sawtooth-shaped latching teeth which extend in the radial direction away from the cutout 4.2, as can be seen in FIG. 4*b*.

Within the rim of the latching teeth there can be seen the first sealing region 4.31, which is curved forward in the axial direction and which extends right around the cutout 4.2. What can also be seen is that the second sealing portion 4.32 extends from one side to the other side of the back-rotation prevention means 4, which can also be seen from the hatchings in FIGS. 3*a* and 3*b*. Since the sealing region 4.3 consists of a soft deformable material, what can also be seen in FIG. 4*a* are two webs which consist of the harder plastics component and which connect the bearing bush 4.5 to the latching toothing 4.4 likewise consisting of the harder plastics component.

Furthermore, the back-rotation prevention means 4 has a ring region 4.6, which likewise consists of the harder plastics component and which serves as a type of enclosure for the softer sealing region 4.3 and imparts the required stability to the back-rotation prevention means 4.

Figure 5A:
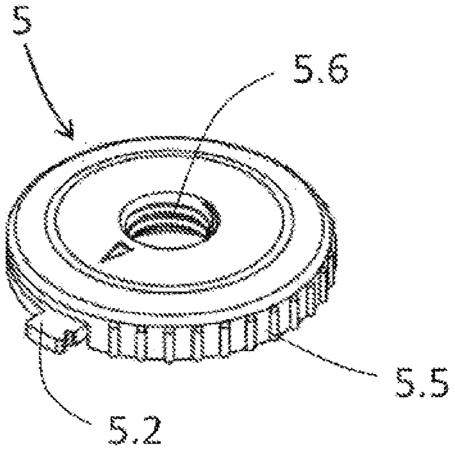
FIGS. 5*a, b* show perspective views of the fastening element.
Figure 5B:
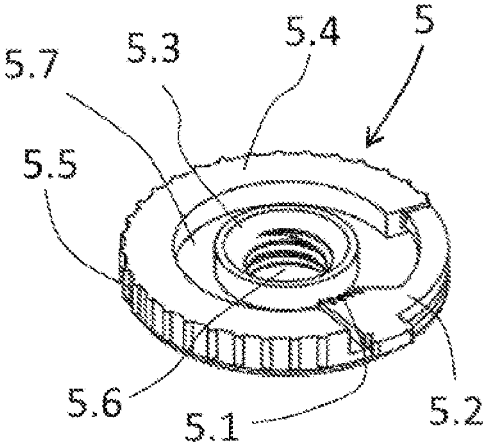

FIGS. 5*a* and 5*b* show the fastening element 5 in two perspective illustrations. It also substantially has a rotationally symmetrical shape. The first pressing region 5.3 and the second pressing region 5.4 can best be seen in FIG. 5*b*.

Furthermore, the fastening element 5 has a threaded bore 5.6 which extends centrally through the fastening element 5. The threaded bore 5.6 is provided with an internal thread which fits with the external thread of the square threaded pin 2, with the result that the fastening element 5 can be screwed onto the square threaded pin 2. Between the pressing regions 5.3, 5.4 that project in the axial direction, there is situated a receiving space 5.7 in which the latching toothing 4.4 is situated when the back-rotation prevention means 4 and the fastening element 5 are in the connected state, as can also be seen from the sectional illustrations of FIGS. 3*a* and 3*b*.

Protruding laterally into the receiving space 4.7 are locking teeth of a locking toothing 5.1 of the fastening element 6. The locking toothing 5.1 is pretensioned in the direction of the threaded bore 5.6, that is to say in the direction of the center of the fastening element 5. However, it is also able to be moved outwardly against the pretensioning force in the radial direction, which will be explained in more detail below.

The individual locking teeth of the locking toothing 5.1 also have a sawtooth-shaped contour. If the fastening element 5 is screwed onto the square threaded pin 2, the latching toothing 4.4 dips from a certain point into the receiving space 4.7, with the result that the latching toothing 4.4 and the locking toothing 5.5 come into engagement with one another. With a further rotation of the fastening element 5 in the screwing-on direction A, the locking toothing 5.1 is moved against the pretensioning thereof such that it latches successively in the manner of a ratchet into the various latching teeth of the latching toothing 4.4. By virtue of the sawtooth-shaped contour of the teeth, it is then no longer possible for the fastening device 5 to be rotated against the screwing-on direction A, since such a movement is blocked. The back-rotation prevention means 4 and the fastening element 5 are then positively connected to one another, at least in one direction of rotation.

Optionally, however, it is possible for the fastening element 5 to be rotated still further in the screwing-on direction A, at least until it has reached the end position illustrated in FIGS. 3*a* and 3*b*. The fastening element 5 and also the back-rotation prevention means 4 can then no longer be removed from the square threaded pin 2, and the square threaded pin 2 is secured in the axial direction and the inner space sealed.

In order to release the fastening element 5 from the back-rotation prevention means 4 again, the connection between the teeth must first of all be undone. The locking toothing 5.1 can for this purpose be moved against the pretensioning thereof, with the result that the latter and the latching toothing 4.4 are disengaged.

Figure 6:
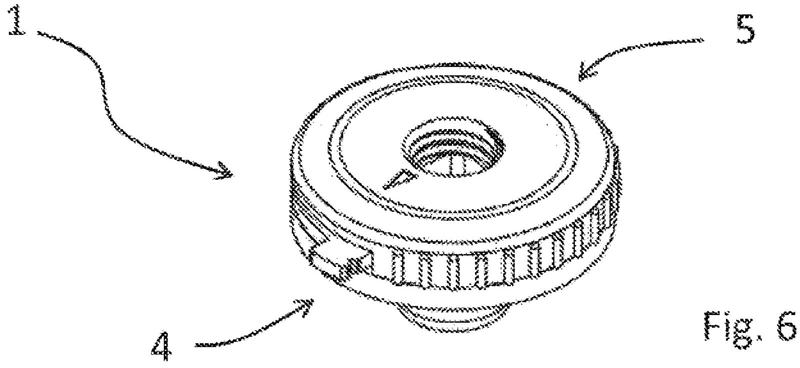
FIG. 6 shows a perspective view of the fastening device.

In order to release the connection, the tensioning device 5.2 that pretensions the locking toothing 5.1 has an unlocking pin. The latter projects in the radial direction beyond the contour of the fastening element 5, as can be seen in the illustrations of FIG. 5*a* and FIG. 6. A movement of the unlocking pin counter to the pretensioning then makes it possible for the locking teeth of the locking toothing 5.1 to be pulled out of the latching teeth of the latching toothing 4.4 and for the positive connection between the back-rotation prevention means 4 and the fastening element 5 to be undone.

Only then is it possible for the fastening element 5 to be unscrewed from the square threaded pin 2 counter to the screwing-on direction A. As soon as the fastening element 5 has been removed from the square threaded pin 2, it is then also the case that the back-rotation prevention means 4 can be removed from the square threaded pin 2 and, in a subsequent step, the square threaded pin can be pushed in the direction of the outer side of the door 3.2 and thus released from the door 3.

REFERENCE SIGNS

1 Fastening device
2 Threaded pin/square threaded pin
3 Closing element/door
3.1 Inner side
3.2 Outer side
3.3 Groove
3.4 Actuating element
3.5 Closure element/cam latch
3.6 Bore
4 Back-rotation prevention means
4.2 Cutout
4.3 Sealing region
4.31 Radial sealing portion/first sealing portion
4.32 Axial sealing portion/second sealing portion
4.33 Sealing lip
4.4 Latching toothing
4.5 Bearing bush
4.6 Ring region
5 Fastening element
5.1 Locking toothing
5.2 Tensioning device
5.3 First pressing region
5.4 Second pressing region
5.5 Handling region

5.6 Threaded bore
5.7 Receiving space
7 Closure actuator
A Screwing-on direction
Fp Pressing force
Fdr Radial sealing force
Fda Axial sealing force

What is claimed is:

1. A fastening device for axially fastening a rotatably mounted threaded pin having a polygonal cross section to a closing element, the fastening device comprising:

a fastening element that can be screwed onto the threaded pin; and a back-rotation prevention seal for securing the screwed-on fastening element, wherein the back-rotation prevention seal has a polygonal cutout for receiving the threaded pin so that the back-rotation prevention seal can be nonrotatably coupled to the threaded pin, and wherein the back-rotation prevention seal has a sealing region that seals the threaded pin in relation to the closing element.

2. The device as claimed in claim 1, wherein the sealing region has a radial sealing portion for sealing the back-rotation prevention seal in relation to the threaded pin.

3. The device as claimed in claim 2, wherein the fastening element has a first pressing region which is configured such that, upon being screwed onto the threaded pin, it presses the radial sealing portion radially onto the threaded pin.

4. The device as claimed in claim 2, wherein the radial sealing portion is curved forward in the axial direction.

5. The device as claimed in claim 1, wherein the sealing region has an axial sealing portion that seals the back-rotation prevention seal in relation to the closing element.

6. The device as claimed in claim 5, wherein the axial sealing portion is arranged on a front end of the back-rotation prevention seal.

7. The device as claimed in claim 5, wherein the fastening element has a second pressing region which is configured such that, upon screwing the fastening element onto the threaded pin, it presses the axial sealing portion axially onto the closing element.

8. The device as claimed in claim 1, wherein the back-rotation prevention seal is plugged nonrotatably onto the threaded pin.

9. The device as claimed in claim 1, wherein the back-rotation prevention seal is connected to the fastening element.

10. The device as claimed in claim 1, wherein the back-rotation prevention seal is latched with the fastening element.

11. The device as claimed in claim 10, wherein the back-rotation prevention seal has latching toothing with a plurality of latching steps.

12. The device as claimed in claim 11, wherein the fastening element has locking toothing for engaging the latching toothing.

13. The device as claimed in claim 1, wherein the back-rotation prevention seal is configured as a multicomponent plastics part, wherein a first plastics component forms the sealing region, and a harder second plastics component forms the remaining regions of the back-rotation prevention seal.

14. A closure actuator for actuating a closure element, the closure element having a threaded pin having a polygonal cross section and a fastening device for fastening the threaded pin to a closing element, wherein the fastening device comprises a fastening element that can be screwed onto the threaded pin; and a back-rotation prevention seal for securing the screwed-on fastening element; wherein the back-rotation prevention seal has a sealing region that seals the threaded pin in relation to the closing element, and wherein the back-rotation prevention seal has a polygonal cutout for receiving the threaded pin so that the back-rotation prevention seal can be nonrotatably coupled to the threaded pin.

15. The actuator as claimed in claim 14, wherein the sealing region has a radial sealing portion for sealing the back-rotation prevention seal in relation to the threaded pin.

16. A closing element, having an actuating element, a closure element, and a closure actuator, wherein the closure actuator is configured to actuate the closure element, the closure element having a threaded pin and a fastening device for fastening the threaded pin to the closing element, wherein the fastening device comprises a fastening element that can be screwed onto the threaded pin; and a back-rotation prevention seal for securing the screwed-on fastening element; wherein the back-rotation prevention seal has a sealing region that seals the threaded pin in relation to the closing element, wherein the threaded pin has a polygonal cross section, and wherein the back-rotation prevention seal has a polygonal cutout for receiving the threaded pin so that the back-rotation prevention seal can be nonrotatably coupled to the threaded pin.

* * * * *